UNITED STATES PATENT OFFICE.

LEOPOLD BADER, OF PILLICHSDORF, AUSTRIA-HUNGARY.

REMEDY FOR SWINE FEVER, PLAGUE, &c.

979,054. Specification of Letters Patent. Patented Dec. 20, 1910.

No Drawing. Application filed March 17, 1910. Serial No. 549,898.

*To all whom it may concern:*

Be it known that I, LEOPOLD BADER, a subject of the Emperor of Austria-Hungary, and residing at Pillichsdorf, Austria-Hungary, have invented certain new and useful Improvements in Remedies for Swine Fever, Plague, and the Like, of which the following is a specification.

This invention relates to a curative and protective treatment for animals and consists in a medicinal compound for healing them when suffering from, and protecting them against swine pox, swine fever and the like, and also consists in a process for preparing such compound.

In carrying the process into effect, a mixture is prepared consisting of approximately 2 to 3 parts by weight of cattle gall and 1 part by weight of hellebore which is preferably cut into small pieces. This mixture is inclosed in a receptacle whose dimensions are somewhat larger than are necessitated by the volume of the mass, and the receptacle is closed air tight and left perfectly undisturbed for some time, until the original yellow and viscous mass has turned ash gray and liquid. In this condition, which may be hastened by submitting the mixture to sunlight, the mixture is at its full healing value and will retain it unchanged for many weeks if kept perfectly air tight.

A mixture producing favorable results is obtained in the following manner: 100 grams of the root-stock of black hellebore (*Helleborus niger*), which has previously been washed and dried, is comminuted and mixed with 250 grams of oxgall. After the mixture has been allowed to stand for some time in the receptacle the woody and fibrous parts of the hellebore are separated out by filtration and the filtrate is stored in glass bottles and is ready for the market. The empty space to be left above the mixture when in the containing vessel should preferably be approximately $\frac{1}{3}$ of the volume of the mass. The medicinal compound thus obtained is injected into both flanks and at the ears of the diseased animal, the total amount used being about one gram. The effect of the injection is generally noticeable in a few hours.

Having now described my invention what I claim as new and desire to secure by Letters Patent is:—

1. A process for preparing a healing and protecting medicinal compound for use against swine fever, swine plague and the like consisting in mixing cattle gall with hellebore, inclosing the mixture in an air tight receptacle and allowing it to stand.

2. A process for preparing a healing and protecting medicinal compound for use against swine fever, swine plague and the like consisting in mixing cattle gall with hellebore, inclosing the mixture in an air tight receptacle the holding capacity of which is greater than that necessitated by the volume of the mixture and allowing the latter to stand.

3. A process for preparing a healing and protecting medicinal compound for use against swine fever, swine plague and the like consisting in mixing cattle gall with hellebore, inclosing the mixture in an air tight receptacle and allowing it to stand in sunlight.

4. A process for preparing a healing and protecting medicinal compound for use against swine fever, swine plague and the like consisting in mixing approximately 250 grams of oxgall with approximately 100 grams of hellebore, inclosing the mixture in an air tight receptacle and allowing it to stand.

5. A process for preparing a healing and protecting medicinal compound for use against swine fever, swine plague and the like, consisting in mixing 250 grams of oxgall with 100 grams of hellebore, inclosing the mixture in an air tight receptacle the holding capacity of which is greater than that necessitated by the volume of the mixture and allowing it to stand in sunlight.

In testimony whereof I affix my signature in presence of two witnesses.

LEOPOLD BADER.

Witnesses:
   AUG. ALFRED KLOR,
   AUGUST FUGGER.